US012694324B2

(12) United States Patent
Bird et al.

(10) Patent No.: US 12,694,324 B2
(45) Date of Patent: Jul. 28, 2026

(54) MULTI-MACHINE BASED COLLABORATIVE LEARNING

(71) Applicant: Akamai Technologies, Inc., Cambridge, MA (US)

(72) Inventors: Robert B. Bird, Orlando, FL (US); Jan Galkowski, Cambridge, MA (US)

(73) Assignee: Akamai Technologies, Inc., Cambridge, MA (US)

( * ) Notice: Subject to any disclaimer, the term of this patent is extended or adjusted under 35 U.S.C. 154(b) by 340 days.

(21) Appl. No.: 16/437,055

(22) Filed: Jun. 11, 2019

(65) Prior Publication Data

US 2020/0175419 A1 Jun. 4, 2020

Related U.S. Application Data

(60) Provisional application No. 62/775,104, filed on Dec. 4, 2018.

(51) Int. Cl.
*G06N 20/00* (2019.01)
*H04L 67/10* (2022.01)

(52) U.S. Cl.
CPC .............. *G06N 20/00* (2019.01); *H04L 67/10* (2013.01)

(58) Field of Classification Search
CPC .......... G06N 20/00; G06N 5/043; G06N 5/02; G06N 3/0454; G06N 3/045; G06N 3/0895; G06N 3/09; G06N 3/096; G06N 3/098; H04L 67/10; H04L 67/2847; H04L 67/5681
See application file for complete search history.

(56) References Cited

U.S. PATENT DOCUMENTS 6,741,974 B1 5/2004 Harrison et al.
9,516,053 B1 * 12/2016 Muddu .................. G06N 20/20
(Continued)

OTHER PUBLICATIONS

"A comprehensive survey on machine learning for networking: evolution, applications and research opportunities", Jun. 2018, Boutaba et al., Journal of Internet Services and Application, Article No. 16 (Year: 2018).*

(Continued)

*Primary Examiner* — Oluwatosin Alabi
(74) *Attorney, Agent, or Firm* — David H. Judson

(57) ABSTRACT

Individual nodes (e.g., edge machines) in an overlay network each build local machine learning (ML) models associated with a particular behavior of interest. Through a communication mechanism, nodes exchange some portion of their ML models between or among each other. The portion of the local model that is exchanged with one or more other nodes encodes or encapsulates relevant knowledge (learned at the source node) for the particular behavior of interest; in this manner, relevant transfer learning is enabled such that individual node models become smarter. Sets of machines that collaborate converge their models toward a solution that is then used to facilitate another overlay network function or optimization. The local knowledge exchange among the nodes creates an emergent behavioral profile used to control the edge machine behavior. Example functions managed with this ML front-end include predictive pre-fetching, anomaly detection, image management, forecasting to allocate resources, and others.

17 Claims, 2 Drawing Sheets

(56)                    References Cited

U.S. PATENT DOCUMENTS

| | | | | |
|---|---|---|---|---|
| 10,482,887 | B1 * | 11/2019 | Jha | G10L 19/0018 |
| 11,176,325 | B2 * | 11/2021 | McAteer | G06F 16/3338 |
| 11,481,665 | B2 * | 10/2022 | Mopur | G06N 3/08 |
| 2013/0185314 | A1 | 7/2013 | Rubenstein et al. | |
| 2014/0165118 | A1 * | 6/2014 | Garcia | H04N 21/26258 |
| | | | | 725/90 |
| 2015/0106308 | A1 | 4/2015 | Harrison et al. | |
| 2015/0235143 | A1 * | 8/2015 | Eder | G16H 50/50 |
| | | | | 706/12 |
| 2015/0332165 | A1 * | 11/2015 | Mermoud | H04L 43/08 |
| | | | | 706/12 |
| 2016/0217387 | A1 * | 7/2016 | Okanohara | G06N 20/00 |
| 2016/0217388 | A1 | 7/2016 | Okanohara et al. | |
| 2016/0232445 | A1 | 8/2016 | Srinivasan et al. | |
| 2017/0024641 | A1 * | 1/2017 | Wierzynski | G06K 9/4628 |
| 2017/0195451 | A1 * | 7/2017 | Backholm | H04L 67/5681 |
| 2017/0353477 | A1 | 12/2017 | Faigon et al. | |
| 2018/0053002 | A1 | 2/2018 | El-Moussa et al. | |
| 2018/0191763 | A1 | 7/2018 | Hillard et al. | |
| 2018/0285767 | A1 * | 10/2018 | Chew | G06N 20/00 |
| 2018/0316928 | A1 * | 11/2018 | Jain | H04N 19/172 |
| 2019/0034716 | A1 * | 1/2019 | Kamarol | G06F 21/6245 |
| 2019/0050683 | A1 * | 2/2019 | Gupta Hyde | G06F 21/6245 |
| 2019/0108417 | A1 * | 4/2019 | Talagala | G06N 20/00 |
| 2019/0166005 | A1 * | 5/2019 | Adjodah | G06N 5/022 |
| 2019/0197780 | A1 * | 6/2019 | Rao | H04W 4/021 |
| 2019/0311098 | A1 * | 10/2019 | Baldwin | G06N 3/045 |
| 2019/0332955 | A1 * | 10/2019 | Manamohan | G06F 18/214 |
| 2019/0356498 | A1 * | 11/2019 | Hernandez Sanchez | |
| | | | | H04L 43/0894 |
| 2020/0027033 | A1 * | 1/2020 | Garg | G06F 17/18 |
| 2020/0204655 | A1 * | 6/2020 | Khalid | H04N 21/25858 |
| 2020/0301743 | A1 * | 9/2020 | Moustafa | G06F 9/5044 |
| 2021/0064141 | A1 * | 3/2021 | Németh | G06N 3/08 |

OTHER PUBLICATIONS

Le Merrer, Erwan. "Structuring Overlays for Distributed Computing: from Edge-Devices to the Clouds." PhD diss., Université de Rennes 1, 2016. (Year: 2016).*
Schäfer D, Edinger J, Becker C. Gpu-accelerated task execution in heterogeneous edge environments. In2018 27th International Conference on Computer Communication and Networks (ICCCN) Jul. 30, 2018 (pp. 1-7). IEEE. (Year: 2018).*
Herbaut N, Negru N. A model for collaborative blockchain-based video delivery relying on advanced network services chains. IEEE Communications Magazine. Sep. 8, 2017;55(9):70-6. (Year: 2017).*
Garcia Lopez P, Montresor A, Epema D, Datta A, Higashino T, Iamnitchi A, Barcellos M, Felber P, Riviere E. Edge-centric computing: Vision and challenges. ACM SIGCOMM Computer Communication Review. Sep. 30, 2015;45(5):37-42. (Year: 2015).*
Cui L, Yang S, Chen F, Ming Z, Lu N, Qin J. A survey on application of machine learning for Internet of Things. International Journal of Machine Learning and Cybernetics. Aug. 2018;9(8):1399-417. (Year: 2018).*

* cited by examiner

MULTI-MACHINE BASED COLLABORATIVE LEARNING

BACKGROUND

Technical Field

This application relates generally to optimizing distributed computing networks.

Brief Description of the Related Art

Distributed computer systems are well-known in the prior art. One such distributed computer system is a "content delivery network" (CDN) or "overlay network" that is operated and managed by a service provider. The service provider typically provides the content delivery service on behalf of third parties (customers) who use the service provider's shared infrastructure. A distributed system of this type typically refers to a collection of autonomous computers linked by a network or networks, together with the software, systems, protocols and techniques designed to facilitate various services, such as content delivery, web application acceleration, or other support of outsourced origin site infrastructure. A CDN service provider typically provides service delivery through digital properties (such as a website), which are provisioned in a customer portal and then deployed to the network.

Machine learning (ML) is the study of algorithms and mathematical models that computer systems use to progressively improve their performance on a specific task. Machine learning algorithms build a mathematical model of sample data, known as "training data", in order to make predictions or decisions without being explicitly programmed to perform the task. Typically, ML tasks are classified in several ways. In supervised learning, an algorithm builds a mathematical model of a set of data that contains both the inputs and the desired outputs. For example, if the task were determining whether an image contained a certain object, the training data for a supervised learning algorithm includes images with and without that object (the input), and each image is given a label (the output) designating whether it contained the object. Semi-supervised learning algorithms develop mathematical models from incomplete training data, where a portion of the sample inputs are missing the desired output. In unsupervised learning, the algorithm builds a mathematical model of a set of data which contains only inputs and no desired outputs. Unsupervised learning algorithms are used to find structure in the data, like grouping or clustering of data points.

In an overlay network such as a CDN, individual nodes (e.g., edge servers) have "local" knowledge. A machine learning (ML) model associated with activities at an edge server can be built, but that model only encodes expertise that in effect is local to that edge server.

There is a need to provide a mechanism by which that local node can augment its model, e.g., using knowledge obtained by its peers, in a computationally-efficient manner, and then use the augmented ML model to facilitate an overlay network optimization or function.

BRIEF SUMMARY

Individual nodes (e.g., edge machines) in an overlay network (e.g., a CDN) each build local models associated with a particular behavior of interest. Through a gossip protocol, or some other equivalent communication mechanism, nodes exchange some portion of their ML models between or among each other. The portion of the local model that is exchanged with one or more other nodes encodes or encapsulates relevant knowledge (learned at the source node) for the particular behavior of interest; in this manner relevant transfer learning is enabled such that individual nodes (namely, their associated ML models) become smarter. Stated another way, in this scheme a number of "partial" models are built locally, and then relevant knowledge is shared among the machines to facilitate a collaborative, cross-validation of the relevant knowledge-base. Sets of machines that collaborate in this manner converge their models toward some solution (e.g., a steady state) that is then used to facilitate the overlay network function or optimization. In this manner, the exchange of local knowledge among the nodes creates an emergent behavioral profile that is then used to control the edge machine behavior. Relevant functions that can be managed with this ML front-end include, without limitation, predictive pre-fetching, image management, anomaly detection (for a security function) forecasting to allocate resources (e.g., within an edge region), and others.

The foregoing has outlined some of the more pertinent features of the subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which.

DETAILED DESCRIPTION

Figure 1:
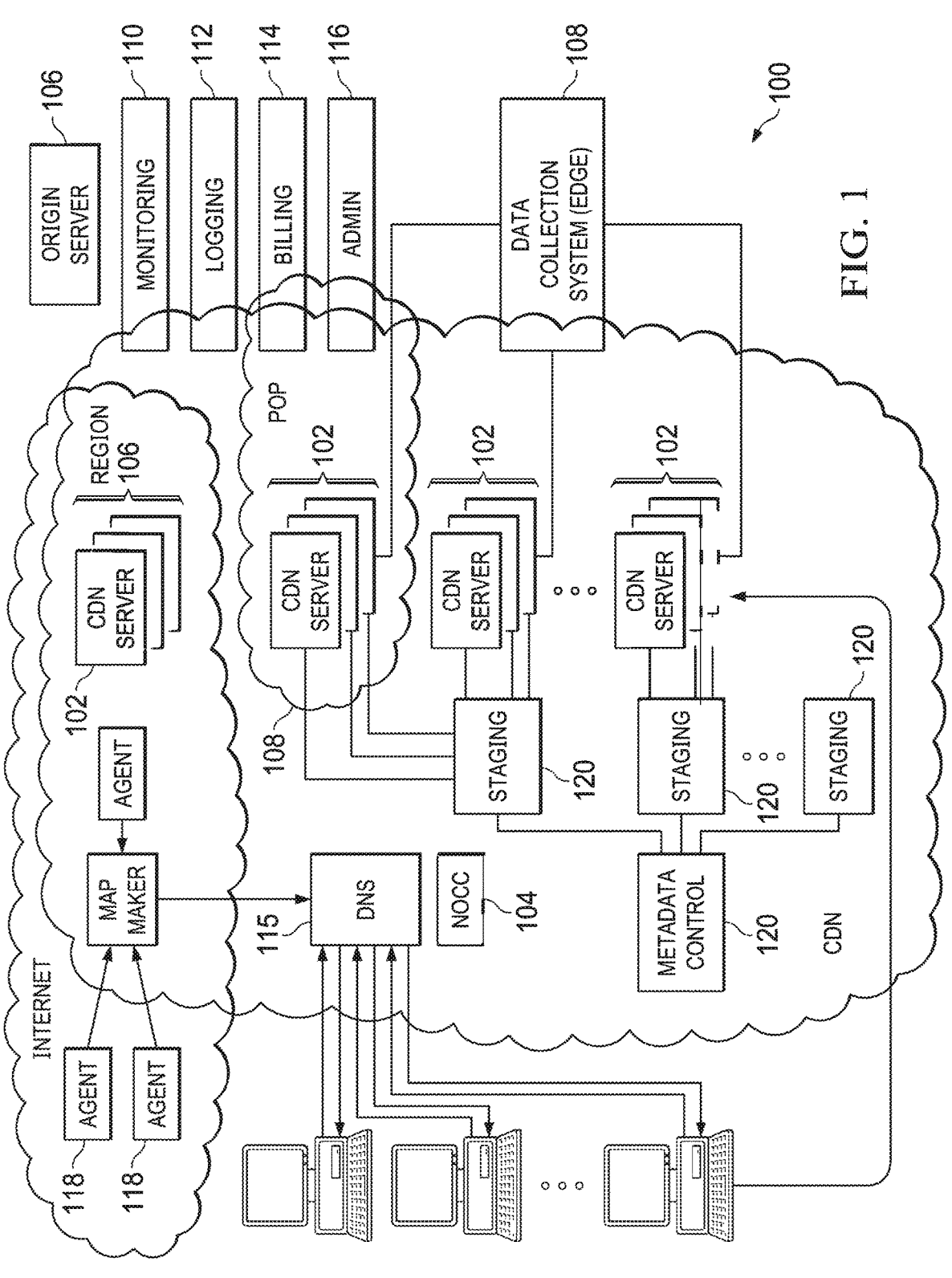
FIG. 1 is a block diagram illustrating a known distributed computer system configured as a content delivery network (CDN)

In a known system, such as shown in FIG. 1, a distributed computer system 100 is configured as a content delivery network (CDN) and is assumed to have a set of machines 102a-n distributed around the Internet. Typically, most of the machines are servers located near the edge of the Internet, i.e., at or adjacent end user access networks. A network operations command center (NOCC) 104 manages operations of the various machines in the system. Third party sites, such as web site 106, offload delivery of content (e.g., HTML, embedded page objects, streaming media, software downloads, and the like) to the distributed computer system 100 and, in particular, to "edge" servers. Typically, content providers offload their content delivery by aliasing (e.g., by a DNS CNAME) given content provider domains or subdomains to domains that are managed by the service provider's authoritative domain name service. End users that desire the content are directed to the distributed computer system to obtain that content more reliably and efficiently.

Although not shown in detail, the distributed computer system may also include other infrastructure, such as a distributed data collection system 108 that collects usage and other data from the edge servers, aggregates that data across a region or set of regions, and passes that data to other back-end systems 110, 112, 114 and 116 to facilitate monitoring, logging, alerts, billing, management and other operational and administrative functions. Distributed network agents 118 monitor the network as well as the server loads and provide network, traffic and load data to a DNS query handling mechanism 115, which is authoritative for content domains being managed by the CDN. A distributed data transport mechanism 120 may be used to distribute control information (e.g., metadata to manage content, to facilitate load balancing, and the like) to the edge servers.

Figure 2:
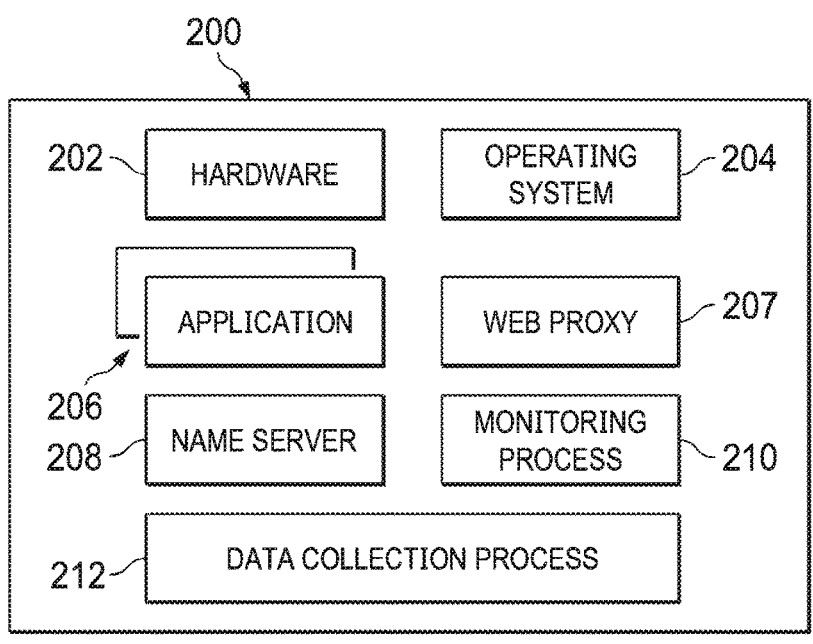
FIG. 2 is a representative CDN edge machine configuration.

As illustrated in FIG. 2, a given machine 200 comprises commodity hardware (e.g., an Intel Pentium processor) 202 running an operating system kernel (such as Linux or variant) 204 that supports one or more applications 206a-n. To facilitate content delivery services, for example, given machines typically run a set of applications, such as an HTTP proxy 207 (sometimes referred to as a "global host" process), a name server 208, a local monitoring process 210, a distributed data collection process 212, and the like. For streaming media, the machine typically includes one or more media servers, such as a Windows Media Server (WMS) or Flash server, as required by the supported media formats.

A CDN edge server is configured to provide one or more extended content delivery features, preferably on a domain-specific, customer-specific basis, preferably using configuration files that are distributed to the edge servers using a configuration system. A given configuration file preferably is XML-based and includes a set of content handling rules and directives that facilitate one or more advanced content handling features. The configuration file may be delivered to the CDN edge server via the data transport mechanism. U.S. Pat. No. 7,111,057 illustrates a useful infrastructure for delivering and managing edge server content control information, and this and other edge server control information can be provisioned by the CDN service provider itself, or (via an extranet or the like) the content provider customer who operates the origin server.

The CDN may include a storage subsystem, such as described in U.S. Pat. No. 7,472,178, the disclosure of which is incorporated herein by reference.

The CDN may operate a server cache hierarchy to provide intermediate caching of customer content; one such cache hierarchy subsystem is described in U.S. Pat. No. 7,376,716, the disclosure of which is incorporated herein by reference.

The CDN may provide secure content delivery among a client browser, edge server and customer origin server in the manner described in U.S. Publication No. 20040093419. Secure content delivery as described therein enforces SSL-based links between the client and the edge server process, on the one hand, and between the edge server process and an origin server process, on the other hand. This enables an SSL-protected web page and/or components thereof to be delivered via the edge server. To enhance security, the service provider may provide additional security associated with the edge servers. This may include operating secure edge regions comprising edge servers located in locked cages that are monitored by security cameras.

As an overlay, the CDN resources may be used to facilitate wide area network (WAN) acceleration services between enterprise data centers (which may be privately-managed) and third party software-as-a-service (SaaS) providers.

In a typical operation, a content provider identifies a content provider domain or sub-domain that it desires to have served by the CDN. The CDN service provider associates (e.g., via a canonical name, or CNAME) the content provider domain with an edge network (CDN) hostname, and the CDN provider then provides that edge network hostname to the content provider. When a DNS query to the content provider domain or sub-domain is received at the content provider's domain name servers, those servers respond by returning the edge network hostname. The edge network hostname points to the CDN, and that edge network hostname is then resolved through the CDN name service. To that end, the CDN name service returns one or more IP addresses. The requesting client browser then makes a content request (e.g., via HTTP or HTTPS) to an edge server associated with the IP address. The request includes a host header that includes the original content provider domain or sub-domain. Upon receipt of the request with the host header, the edge server checks its configuration file to determine whether the content domain or sub-domain requested is actually being handled by the CDN. If so, the edge server applies its content handling rules and directives for that domain or sub-domain as specified in the configuration. These content handling rules and directives may be located within an XML-based "metadata" configuration file.

More generally, the techniques described herein are provided using a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, that provide the functionality of a given system or subsystem. As described, the functionality may be implemented in a stand-alone machine, or across a distributed set of machines. The functionality may be provided as a service, e.g., as a SaaS solution.

Because the CDN infrastructure is shared by multiple third parties, it is sometimes referred to herein as a multi-tenant shared infrastructure. The CDN processes may be located at nodes that are publicly-routable on the Internet, within or adjacent nodes that are located in mobile networks, in or adjacent enterprise-based private networks, or in any combination thereof.

As used herein, an "edge server" refers to a CDN (overlay network) edge machine or server process used thereon.

Multi-Machine Based Collaborative Learning

Conventionally, machine learning assumes a single machine (typically a host process executing thereon) that is trained on a model and then proceeds to observe incoming data and incorporate that into its decision-making. This approach is limited insofar as that single machine can only "observe" a limited amount of data. But, what if multiple machines (e.g., other edge servers) could run machine learning in parallel, and periodically synchronize their observations? These "peer" machine learners would need to have way of exchanging a sort of digest of what they had observed, in a way that the receiving peer could easily take in and incorporate into, e.g., into its own classification algorithm. The technique of this disclosure provides a solution of this type.

According to this disclosure, individual nodes (e.g., edge machines, servers, appliances and devices) in an overlay network (e.g., a CDN) each build local models associated with a particular behavior of interest. Through a gossip protocol, or some other equivalent communication mechanism, nodes exchange some portion of their ML models between or among each other. The portion of the local model that is exchanged with one or more other nodes encodes or encapsulates relevant knowledge (learned at the source node) for the particular behavior of interest; in this manner, relevant transfer learning is enabled such that individual nodes (namely, their associated ML models) become smarter. Stated another way, in this scheme a number of "partial" models are built locally, and then relevant knowledge is shared between and among the machines to facilitate a collaborative, cross-validation of the relevant knowledge-base. Sets of machines that collaborate in this manner converge their models toward some steady state solution that is then used to facilitate the overlay network function or optimization. The exchange of local knowledge among the nodes creates an emergent behavioral profile that is then used to control the edge machine behavior. Relevant functions that can be managed with this ML front-end include, without limitation, predictive pre-fetching, image management, forecasting to allocate resources (e.g., in-region), anomaly detection for security purposes, and others.

Figure 3:
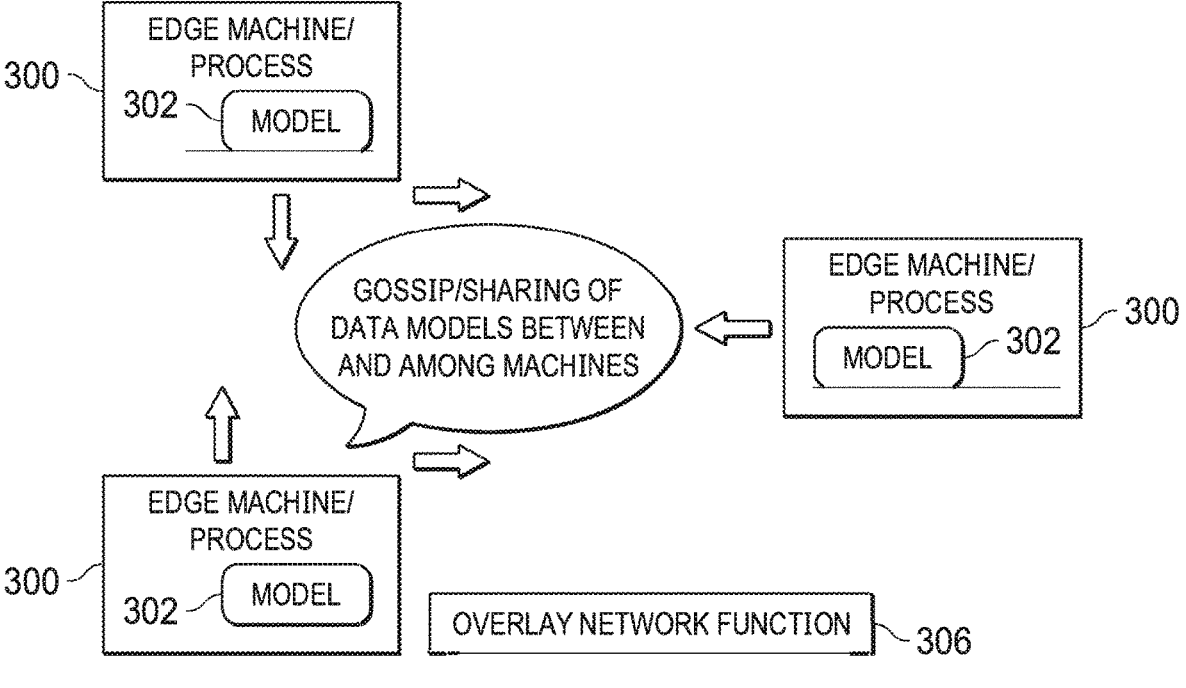
FIG. 3 is a representative system of this disclosure in which a set of edge machines collaborate to share local knowledge to facilitate building a cross-machine or steady state model that is then used locally to facilitate control over some other overlay networking function or operation.

FIG. 3 depicts the basic operating mechanism. In this example scenario, a set of edge machines 300 are provided. The machines act as peer computing nodes in a multi-machine collaborative learning technique of this disclosure. To this end, each edge machine builds a local machine learning model 302 of a particular behavior of interest. The edge machines communicate these models (or portions thereof) with one another, e.g., by a gossip protocol or other group communication mechanism. Using knowledge obtained from one or more its peers, a machine 300 then adjusts its local model such that the local classification algorithm being executed by a machine is augmented or enhanced by the knowledge that was taken in by one or more of its peers. The notion of adjusting the local model should be broadly construed as updating, modifying, enhancing, refining, rebuilding, and so forth. When the problem addressed is stationary in nature (i.e., it has a solution that evolves to a solution over time), augmented models eventually converge to a steady state solution. Whether the problem (captured by the data being modeled) is stationary or non-stationary, a local machine then uses the augmented model to facilitate an overlay network optimization or function.

In one embodiment, a collaborative model that is built in the manner described above is used to provide an enhanced content pre-fetching mechanism 306, namely, one that is built on machine learning that learns where to pre-position content. A pre-fetch mechanism may be one such as described in U.S. Pat. Nos. 8,447,837, 9,819,721, and others, commonly-owned by Akamai Technologies, Inc. of Cambridge, Massachusetts. In another embodiment, the collaborative model is used to facilitate an anomaly detection, such as in the context of a web application firewall, a solution described in commonly-owned U.S. Pat. No. 8,458, 769. Another use case involves using the modified model for an overlay networking routing function, such as DNS-based mapping. There is no restriction on how a particular model built in this collaborative manner may be used in the context of the overlay network.

More generally, the approach herein is designed to be de-centralized; thus, in contrast to the prior art where a model is built in a centralized manner and then distributed and applied to other computing nodes, the approach herein assumes that each of a set of global host processes (running on a set of edge machines) is acting as a machine learner, which then communicates with other nearby global host processes to incorporate relevant observations (e.g., of request patterns). As used here, nearby refers to machines that are physically co-located (in a region or set of such machines), those that are not necessarily co-located physically but that are still sufficiently close to one another in a network sense (e.g., based on some latency measurement), or machines that are even further afar from a source node. Indeed, any other sets of machines may be used in a collaboration (to build a model) if the machines are configured to communicate with one another efficiently and reliably so that a useful model is developed.

Preferably, the type of model building described herein is a continuous process, with edge machines (all across the overlay network) generating models and sharing the relevant observations. As such, there is no centralized control and no "central" model that is created and distributed to the other machines; rather, throughout the overlay network different subsets of machines are building/collaborating with one another such that many "variants" or "versions" of the model are being derived and shared by the various subsets. A preferred technique to create a model is based on multicasting (using gossiping) wherein a node propagates its model to other nearby nodes, e.g., using a fan-out (a multicasting tree), after which one or more of such nearby nodes then further propagate the model farther afield. Meanwhile, other edge machines (and thus other groupings or subset(s) of machines) are doing likewise. Preferably, there is no absolute sequence or ordering of the data transfer(s); rather, data is being shared on an ad hoc basis continuously. As a result, and even where a "model" is of the same type, individual computing nodes are expected to have different variants or versions of the model in question (since the data used to build that model will be variable across subsets or groupings). Preferably, there is no central control over a version of a model; rather, each local machine preferably has its own version of the model. In this type of ad hoc approach, the specific topology of the overlay (or portions thereof) is not limiting; rather, the model building preferably is carried out in parallel (across nodes throughout the network), with a particular model variant/version being associated with a subset of the machines of the overall overlay network. The result is a highly scalable collaborative learning system.

The techniques described above are not limited to the intermediary being an edge server within an overlay network; thus, the above methods should be generalized with respect to any third party entity (system, device, machine, program, process, execution thread, etc.) and not just the CDN edge server as described.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject disclosure also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus. While given components of the system have been described separately, one of ordinary skill will appreciate that some of the functions may be combined or shared in given instructions, program sequences, code portions, and the like.

Preferably, the model building and sharing functionality is implemented in an application layer solution, although this is not a limitation.

The functionality may be implemented with other application layer protocols besides HTTP and HTTPS, such as SSL VPN, or any other protocol having similar operating characteristics.

There is no limitation on the type of computing entity that may implement the client-side or server-side of the connection. Any computing entity (system, machine, device, program, process, utility, or the like) may act as the client or the server. There is no limitation on the type of computing entity that may implement the client-side or server-side of the connection. Any computing entity (system, machine, device, program, process, utility, or the like) may act as the client or the server.

While given components of the system have been described separately, one of ordinary skill will appreciate that some of the functions may be combined or shared in given instructions, program sequences, code portions, and the like. Any application or functionality described herein may be implemented as native code, by providing hooks into another application, by facilitating use of the mechanism as a plug-in, by linking to the mechanism, and the like.

More generally, the techniques described herein are provided using a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, that provide the functionality of a given system or subsystem. As described, the functionality may be implemented in a stand-alone machine, or across a distributed set of machines. The functionality may be provided as a service, e.g., as a SaaS solution.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While given components of the system have been described separately, one of ordinary skill will appreciate that some of the functions may be combined or shared in given instructions, program sequences, code portions, and the like.

There is no limitation on the type of computing entity that may implement the functionality described herein. Any computing entity (system, machine, device, program, process, utility, or the like) may be used. As also noted, the machine or process that builds the local model may be co-located with other such machines or processes, or otherwise sufficiently close so that the knowledge obtained by the other machines or processes can be incorporated usefully in the local model.

While given components of the system have been described separately, one of ordinary skill will appreciate that some of the functions may be combined or shared in given instructions, program sequences, code portions, and the like. Any application or functionality described herein may be implemented as native code, by providing hooks into another application, by facilitating use of the mechanism as a plug-in, by linking to the mechanism, and the like.

The technique for multi-machine collaborative learning herein (when applied, as has been described) provides for an improvement in another technology or technical field, namely, overlay networking (content delivery) systems. Prior art overlay networking does not incorporate multi-node collaboration using selective transfer learning, let alone to control/manage overlay network functions or to provide other optimizations.

An edge machine/process may exchange information (e.g., its local ML model, or portion thereof) with a peer machine/process using any group-based or direct peer-to-peer based communication mechanism, including conventional HTTPS-based request and response, serialization-based request and response, etc. and such data sharing may be carried out over multicast, unicast or the like. Machines/processes may communicate with one another over wired and/or wireless connections. One particular technique that may be used to share models may use existing WAN and/or LAN infrastructure in the overlay network that is used for communicating other control information and data between and among edge server machines. Of course, the nature of the communication will depend on the type of model being built.

Models may be updated periodically, continuously, synchronously, asynchronously, on-demand, or in response to a given event, occurrence or trigger. From a temporal perspective, the steady state may be short, medium or long term.

There is no limitation on the type of learning or knowledge-based model that is implemented locally.

Particular machines/processes that implement the machine learning and share their knowledge to create emergent behavior according to the technique herein may be of any type including, without limitation, edge network computing nodes (which are typically rack-mounted in network-accessible data centers), Internet-of-Things (IoT) devices, cloud infrastructure-based computing nodes and resources, virtualized computing nodes, virtual machines, and the like.

The particular geographic and/or network extent of the model sharing is not intended to be limiting.

Local data collection techniques (for supporting local model building) include, without limitation, active and passive data collection, data traffic monitoring, packet inspection, application layer-based, operating system kernel-based, and otherwise.

There may be many different types of machine learning techniques that may be used to facilitate a given collaboration, and more than one technique may be used by given subsets of edge machines that are cooperating or collaborating in this manner. The nature of the data sharing across nodes will depend on the type of model being built. In one embodiment, the machine learning is based on a K-nearest neighbor algorithm. This approach is useful for an edge network-based environment since much of the data being used already resides on the edge node. In this approach, a local model (associated with a given machine) trains on a set of exemplars that are learned from the data collected. Exemplars represent lossy compression of the input data that has been seen. The K-nearest exemplars are then shared with the nearby nodes, typically in the form of a data set vector. The node that receives this data then adjusts its local knowledge vector accordingly (e.g., by averaging in the new vector, finding a median, etc.) to create the adjusted model, which can then be applied to the overlay network optimization task at hand.

In another embodiment, neural networks are used for the learning. Neural networks here may perform in-band learning, or out-of-band learning. In-band learning involves keeping track of pieces of interesting data (e.g., anomalies), and then gossiping this data to the nearby nodes. In out-of-band learning, the neural network comprises a set of weights (floating point numbers over which various mathematical operations are performed), and it is the set of weights that are shared to facilitate the collaboration. To this end, a receiving node would take the weights received and incorporate them in its weight matrix/vector, or the like. Another approach to training a neural network is to create a trained lightweight model (in the manner described) and then share it to a subset of the other nodes.

Edge machines herein may operate as on-line learners, which learn in real-time using streamed data, or off-line learners, which learn by training over and over on a single batch of data. Preferably, a node is a life-long learner, which is a node that becomes smarter the longer it operates in this collaborative manner.

The problem(s) being modeled by a particular model may be stationary or non-stationary.

Some edge nodes may use the described technique, while certain other nodes may be configured not to use the technique. A given node may provide this functionality only at certain times, or at certain times of day. A particular node may be managed by an overlay network configuration to provide a model in association with a particular constraint, e.g., a customer control, a domain, or the like.

What is claimed is as follows:

1. A method carried out in an overlay network comprising a shared infrastructure, the shared infrastructure comprising a set of edge network machines, comprising:

collecting data at each of first and second edge network machines, the first and second edge machines comprising a first subset of the set of edge network machines, the collected data representing information observed by the respective edge network machine;

at each of the first and second edge network machines, building a machine learning model from the data collected;

at the first edge network machine, receiving information from the second edge network machine, the information associated with the machine learning model built by the second edge network machine;

at the first edge network machine, augmenting its machine learning model with the information received from the second edge network machine to generate an augmented machine learning model that converges to a first emergent knowledge solution uniquely associated to the first subset of the set of edge network machines, the augmented machine learning model being distinct from a variant machine learning model built by a second subset of the set of edge network machines, the variant machine learning model built from the collected data representing the information as observed by the respective edge network machines in the second subset and that converges to a second emergent knowledge solution uniquely associated to the second subset of the set of edge network machines; and performing an overlay network optimization using the augmented machine learning model, wherein the overlay network optimization is one of: predictive pre-fetching, anomaly detection, image management, and forecasting to allocate resources;

where in building the augmented machine learning model and the variant machine learning model, the edge network machines in the first and second subsets operate on an ad hoc basis and without central control.

2. The method as described in claim 1 wherein the overlay network optimization is a content pre-fetching operation carried out at the first edge network machine.

3. The method as described in claim 1 wherein the information is received from the second edge machine via a gossip protocol.

4. The method as described in claim 1 wherein the first and second edge network machines are co-located.

5. The method as described in claim 1 wherein the first and second edge network machines are not physically co-located but are close to one another in a network sense.

6. The method as described in claim 1 wherein the overlay network is a content delivery network (CDN) managed by a service provider.

7. The method as described in claim 1 wherein the information is received from the second edge machine periodically.

8. The method as described in claim 1 wherein the machine learning model is one of: a K-nearest neighbor model, and a neural network.

9. An overlay network, comprising:

a set of machine processes associated together, each of the machine processes building a knowledge model local to that machine process, the set of machine processes participating in selective transfer learning among each other on an ad hoc basis and without central control, wherein individual knowledge models local to a particular process operating in a first subset of machine processes converge to a first emergent knowledge solution, and wherein individual knowledge models local to the particular process operating in a second subset of machine processes converge to a second emergent knowledge solution, the second emergent knowledge solution being a variant of the first emergent knowledge solution; and performing an overlay network function or optimization by applying the first or second emergent knowledge solution;

wherein the set of machine processes are software executing on hardware.

10. The overlay network as described in claim 9 wherein the overlay network function or optimization is one of: predictive pre-fetching, anomaly detection, image management, forecasting to allocate resources, mapping control and others.

11. The overlay network as described in claim 9 wherein the transfer learning is facilitated using a gossip protocol or other group communication mechanism.

12. The overlay network as described in claim 9 wherein a knowledge model is a machine learning classification algorithm.

13. The overlay network as described in claim 9 wherein first and second of the set of machine processes are co-located.

14. The overlay network as described in claim 9 wherein first and second of the set of machine processes are not necessarily physically co-located but are close to one another in a network sense.

15. A distributed computing system, comprising:

machines and associated processes that collaborate amongst each other on an ad hoc basis and without central control with respect to a behavior of interest to converge local knowledge at each machine toward a model of emergent behavior of interest across first and second subsets of the machines, wherein the model of emergent behavior of interest across the first subset of the machines is a variant of the model of emergent behavior of interest across the second subset of the machines; and a particular machine that applies the model of emergent behavior of interest to control a networking function or optimization local to the particular machine.

16. The distributed computing system as described in claim 15 wherein the machines are edge servers in a content delivery network.

17. The distributed computing system as described in claim 16 wherein the networking function or optimization local to the particular machine is a content pre-positioning operation.

\* \* \* \* \*